(12) United States Patent
Bittmann (10) Patent No.: US 9,910,847 B2
(45) Date of Patent: Mar. 6, 2018

(54) LANGUAGE IDENTIFICATION

(71) Applicant: Accenture Global Services Limited, Dublin (IE)

(72) Inventor: Mark Bittmann, Chantilly, VA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 95 days.

(21) Appl. No.: 14/502,465

(22) Filed: Sep. 30, 2014

(65) Prior Publication Data

US 2016/0092427 A1    Mar. 31, 2016

(51) Int. Cl.
*G06F 17/27* (2006.01)
*G06F 17/30* (2006.01)

(52) U.S. Cl.
CPC .... *G06F 17/2785* (2013.01); *G06F 17/30705* (2013.01)

(58) Field of Classification Search
None
See application file for complete search history.

(56) References Cited

U.S. PATENT DOCUMENTS

| 5,301,109 A | 4/1994 | Landauer et al. |
| 2003/0037073 A1* | 2/2003 | Tokuda ............... G06F 17/271 715/234 |
| 2006/0036614 A1* | 2/2006 | Simske .......... G06F 17/30705 |
| 2006/0265209 A1* | 11/2006 | Bradford ........... G06F 17/2809 704/9 |
| 2006/0294101 A1* | 12/2006 | Wnek ............. G06F 17/30011 |
| 2014/0006013 A1* | 1/2014 | Markatou ........... G06F 17/3061 704/9 |

FOREIGN PATENT DOCUMENTS

WO    2014/047727    4/2014

OTHER PUBLICATIONS

"The Extended European search report", European Patent Application No. 15187618.2, dated Feb. 4, 2016, 8 pages.

* cited by examiner

*Primary Examiner* — Keara Harris
(74) *Attorney, Agent, or Firm* — Mannava & Kang, P.C.

(57) ABSTRACT

A plurality of documents in each of a plurality of languages can be received. A Latent Semantic Indexing (LSI) index can be created from the plurality of documents. A language classification model can be trained from the LSI index. A document to be identified by language can be received. A vector in the LSI index can be generated for the document to be identified by language. The vector can be evaluated against the language classification model.

18 Claims, 8 Drawing Sheets

LANGUAGE IDENTIFICATION

TECHNICAL FIELD

The disclosed technology relates to language detection and identification generally. Example embodiments relate to the use of Latent Semantic Indexing (LSI) to identify the language of a document.

BACKGROUND

The ability to identify the language used in a document is useful in a variety of situations. For example, many content analysis techniques, such as those of natural language processing (NLP), are language-dependent, and rely on accurate language identification as a condition precedent.

SUMMARY

The technology described herein includes computer implemented methods, computer program products, and systems for language identification.

In some embodiments a plurality of documents in each of a plurality of languages can be received. A Latent Semantic Indexing (LSI) index can be created from the plurality of documents. A language classification model can be trained from the LSI index. A document to be identified by language can be received. A vector in the LSI index can be generated for the document to be identified by language. The vector can be evaluated against the language classification model.

In some embodiments, the plurality of documents comprises a substantially uniform number of documents in each language of the plurality of languages. In some embodiments, the LSI training index is a term vector index. In some embodiments, training a language classification model from the LSI training index comprises training the language classification model using one of: a naïve Bayes classifier, a Bayesian network, a nearest neighbor search, and a C4.5 Decision Tree.

In some embodiments, creating a Latent Semantic Indexing (LSI) index from the plurality of documents comprises: partitioning the plurality of documents into a training subset and test subset, and creating the LSI index from the plurality of training documents. In such embodiments, training a language classification model from the LSI index comprises: training a language classification model using each of a plurality of machine learning techniques on the training subset, measuring the performance of each model on the test subset, and modeling language classification using the trained model with the best measured performance. In some such embodiments, the performance of each model is measured using at least one of: a true positive rate, a false positive rate, a precision, a recall, and an F-measure.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Example System Architectures

Turning now to the drawings, in which like numerals represent like (but not necessarily identical) elements throughout the figures, example embodiments of the present technology are described in detail.

Figure 1:
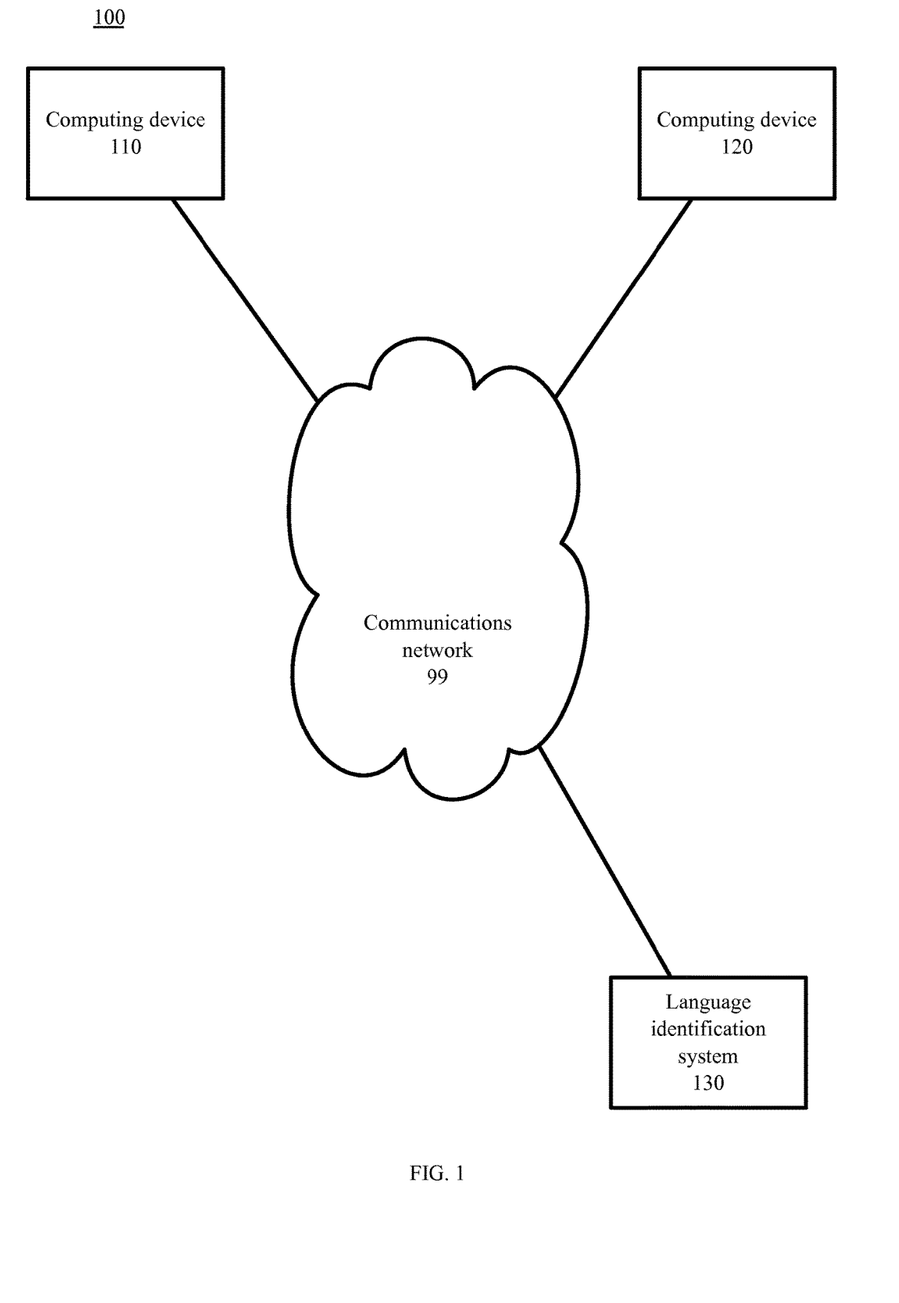
FIG. 1 is a block diagram depicting a communications and processing architecture for language identification, in accordance with certain example embodiments.

FIG. 1 is a block diagram depicting a communications and processing architecture 100 for courier scheduling, in accordance with certain example embodiments. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network devices 110, 120, and 130; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, and 130 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a user of the language identification system 130 may operate each of network devices 110 and 120; a language identification system operator operate network device 130.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, consumer device computing device 110 may be embodied as a mobile phone or handheld computer may not include all the components described above.

Figure 7:
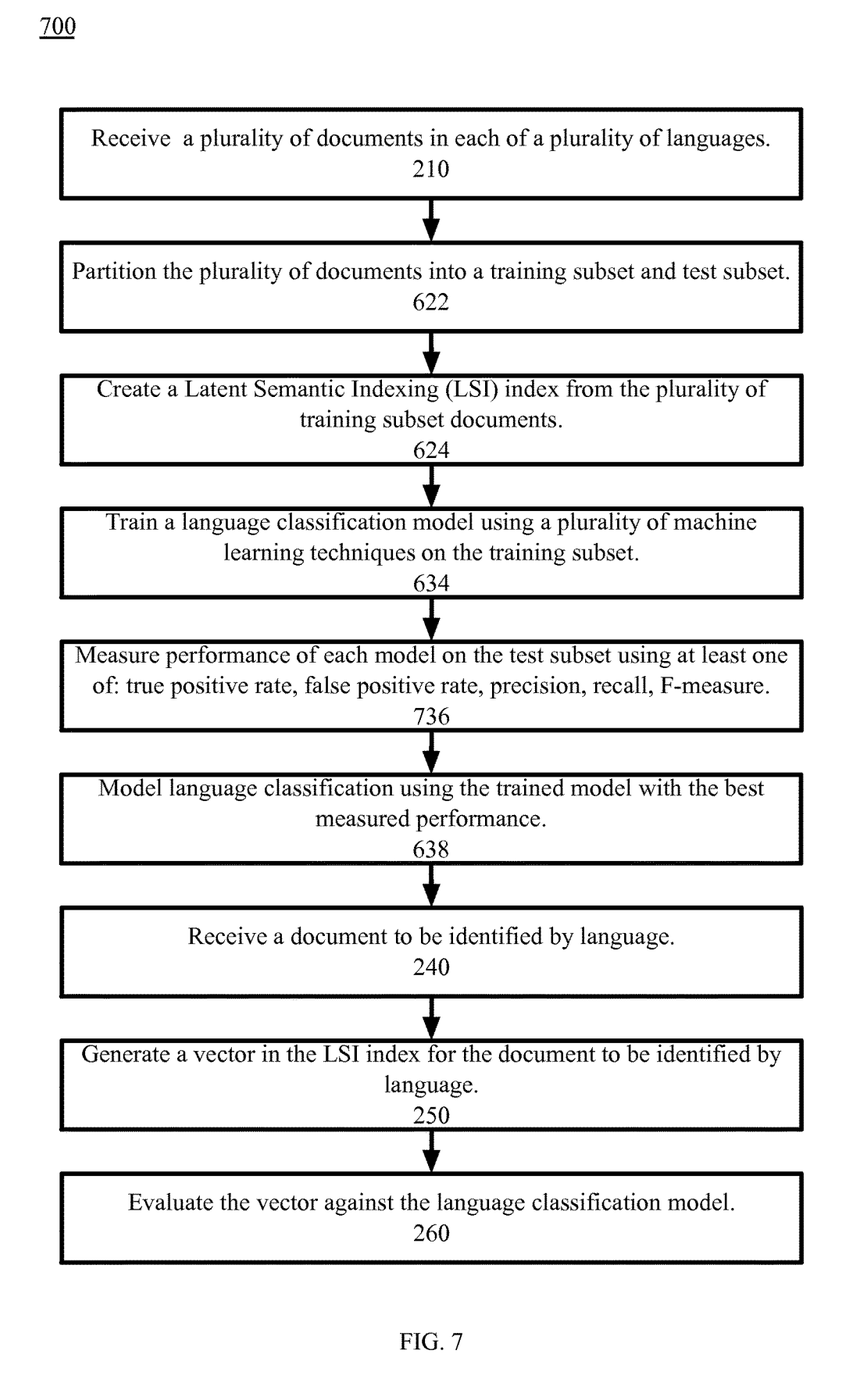
FIG. 7 is a block flow diagram depicting language identification, in accordance with certain example embodiments of the disclosed technology.

In example embodiments, the network computing devices, and any other computing machines associated with the technology presented herein, may be any type of computing machine such as, but not limited to, those discussed in more detail with respect to FIG. 7. Furthermore, any modules associated with any of these computing machines, such as modules described herein or any other modules (scripts, web content, software, firmware, or hardware) associated with the technology presented herein may by any of the modules discussed in more detail with respect to FIG. 7. The computing machines discussed herein may communicate with one another as well as other computer machines or communication systems over one or more networks, such as network 99. The network 99 may include any type of data or communications network, including any of the network technology discussed with respect to FIG. 7.

Example Processes

The example methods illustrated in the following figures are described hereinafter with respect to the components of the example operating environment and example architecture described elsewhere herein. The example methods may also be performed with other systems and in other environments.

Figure 2:
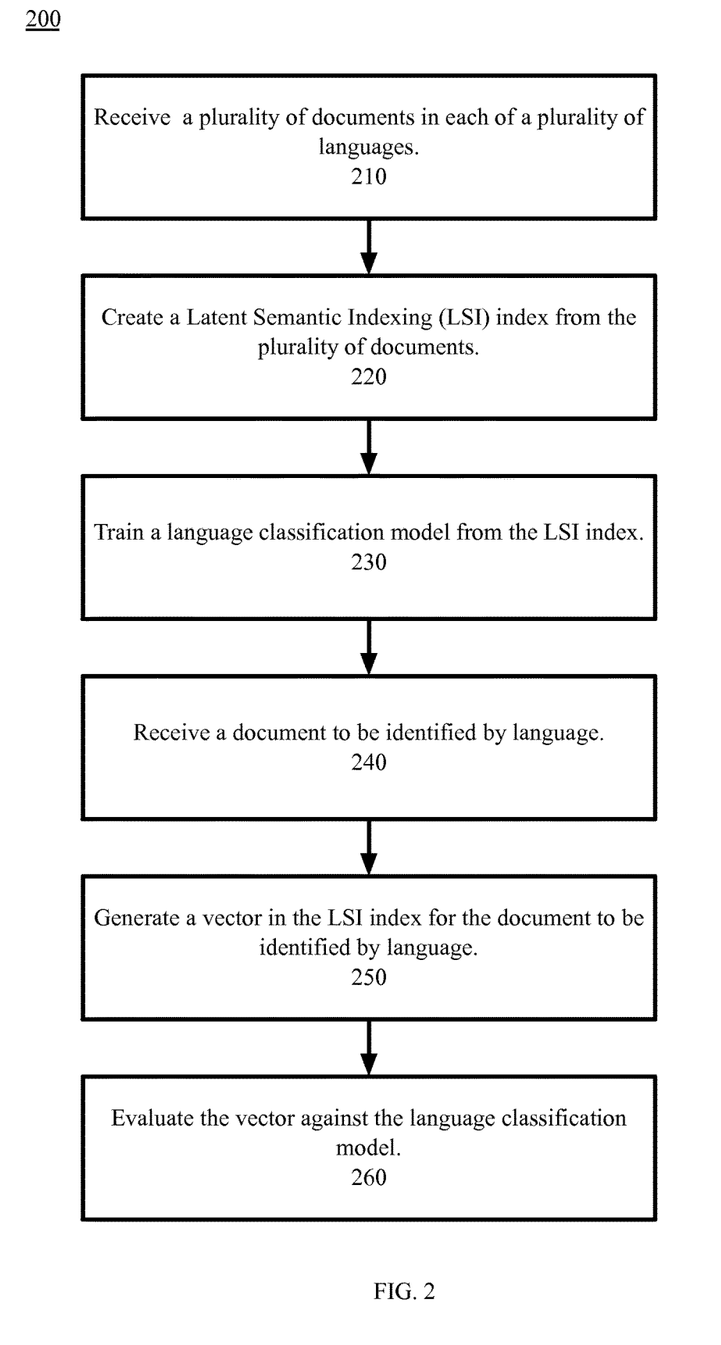
FIG. 2 is a block flow diagram depicting language identification, in accordance with certain example embodiments of the disclosed technology.

Referring to FIG. 2, and continuing to refer to FIG. 1 for context, a block flow diagram depicting language identification, in accordance with certain example embodiments of the present technology is shown. In such methods, a plurality of documents, in each of a plurality of languages, can be received—Block 210.

As a continuing example, consider the corpus of twelve documents (chapters of the Bible) in four (4) different languages, as shown in Table 1. The documents themselves can be found at APPENDIX A—Multi-Lingual Training Corpus accompanying this disclosure.

TABLE 1

Chapters and Languages for the Training
Corpus of the Continuing Example

| Language | Book | Chapter | Doc ID |
|---|---|---|---|
| English | Leviticus | 1 | en_leviticus1 |
| English | Leviticus | 2 | en_leviticus2 |
| English | Leviticus | 3 | en_leviticus3 |
| English | Leviticus | 4 | en_leviticus4 |
| Spanish | Genesis | 1 | es_genesis1 |
| Spanish | Genesis | 2 | es_genesis2 |
| Spanish | Genesis | 3 | es_genesis3 |
| Spanish | Genesis | 4 | es_genesis4 |
| French | Exodus | 1 | fr_exodus1 |

TABLE 1-continued

Chapters and Languages for the Training
Corpus of the Continuing Example

| Language | Book | Chapter | Doc ID |
|---|---|---|---|
| French | Exodus | 2 | fr_exodus2 |
| French | Exodus | 3 | fr_exodus3 |
| French | Exodus | 4 | fr_exodus4 |

A Latent Semantic Indexing (LSI) index can be created from the plurality of received documents—Block 220. As known to those of skill in the relevant art, creation of an LSI index typically includes pre-processing of the corpus, formation of a term-document matrix across the pre-processed corpus, and Singular Value Decomposition (SVD) of the term-document matrix into a reduced dimensional representation (with respect to the term-document matrix). In some embodiments, local and global weighting functions can be applied to the term-document matrix. For example, the weighting function can be a function of the relative frequency of each term in a given document (local weighting) and the relative frequency of each term across the corpus (global weighting). Preprocessing can include term filtering (for example, removal of stopwords and removal of terms that occur in only one document in the corpus), term normalization (for example, converting all characters to lower case), and word stemming.

In the continuing example, stopwords (as listed in APPENDIX B—Stopwords) have been removed from the corpus. TABLE 2 presents a portion of the term-document matrix of the continuing example.

TABLE 2

Sample Portion of the Term-Document
Matrix of the Continuing Example

| | aaron | abel | abraham | acaso | accepted | ... |
|---|---|---|---|---|---|---|
| en_leviticus1 | 4 | 0 | 0 | 0 | 2 | ... |
| en_leviticus2 | 3 | 0 | 0 | 0 | 0 | ... |
| en_leviticus3 | 4 | 0 | 0 | 0 | 0 | ... |
| en_leviticus4 | 0 | 0 | 0 | 0 | 0 | ... |
| es_genesis1 | 0 | 0 | 0 | 0 | 0 | ... |
| es_genesis2 | 0 | 0 | 0 | 0 | 0 | ... |
| es_genesis3 | 0 | 0 | 0 | 1 | 0 | ... |
| es_genesis4 | 0 | 7 | 0 | 1 | 0 | ... |
| fr_exodus1 | 0 | 0 | 0 | 0 | 0 | ... |
| fr_exodus2 | 0 | 0 | 1 | 0 | 0 | ... |
| fr_exodus3 | 0 | 0 | 3 | 0 | 0 | ... |
| fr_exodus4 | 4 | 0 | 1 | 0 | 0 | ... |

In the continuing example, dimensionality reduction is performed using a PYTHON® programming language SVD program (scipy.numpy.linalg). Application of SVD yields a 12×12 document matrix, a portion of which is shown in TABLE 3. While the LSI document matrix is used in the continuing example, the term LSI term matrix also can be used.

TABLE 3

First 5 Dimensions of the Training Document
Vectors of the Continuing Example

| | dim0 | dim1 | dim2 | dim3 | dim4 |
|---|---|---|---|---|---|
| en_leviticus1 | 0.377 | 0 | 0.002 | 0 | 0.07 |
| en_leviticus2 | 0.383 | 0 | 0.002 | 0 | 0.847 |
| en_leviticus3 | 0.382 | 0 | 0.004 | 0.001 | 0.1 |

TABLE 3-continued

First 5 Dimensions of the Training Document
Vectors of the Continuing Example

|  | dim0 | dim1 | dim2 | dim3 | dim4 |
|---|---|---|---|---|---|
| en_leviticus4 | 0.752 | 0 | −0.011 | 0 | −0.517 |
| es_genesis1 | 0 | 0.771 | −0.001 | −0.523 | 0 |
| es_genesis2 | 0 | 0.441 | 0 | 0.313 | 0 |
| es_genesis3 | 0 | 0.405 | −0.001 | 0.257 | 0 |
| es_genesis4 | 0 | 0.214 | 0 | 0.75 | 0 |
| fr_exodus1 | 0 | 0.002 | 0.15 | 0.005 | −0.008 |
| fr_exodus2 | 0.001 | 0 | 0.3 | 0.001 | −0.011 |
| fr_exodus3 | 0.002 | 0.001 | 0.579 | 0 | −0.02 |
| fr_exodus4 | 0.005 | 0.001 | 0.743 | −0.002 | 0.011 |

A language identification model can be trained from the LSI index—Block 230. A variety of machine learning approaches can be used to develop the classification model (also known as a classifier). For example, structured prediction (such as Bayesian networks), supervised learning (such as naïve Bayes classifiers and decision trees), clustering, and neural networks can be used to train a language identification model from the LSI index.

In the continuing example, after normalizing each vector to unit length (as shown in TABLE 4 for the first four (4) dimensions of each vector forming the normalized LSI index), a pattern can be detected, using a machine learning approach, in the elements indicated by "*<value>*" in relation to the language label of each document. The values of the lower dimensions, particularly the first three dimensions, are strong indicators of the source language of the training documents. In the continuing example, while the data has been chosen to produce a pattern apparent to an observer for illustration purposes, machine learning will detect patterns that would likely not be discernable to human observers.

TABLE 4

First 5 Dimensions of the Training Document Vectors
of the Continuing Example - Normalized

|  | dim0 | dim1 | dim2 | dim3 | dim4 |
|---|---|---|---|---|---|
| en_leviticus1 | * 0.983 * | 0.000 | 0.005 | 0.000 | * 0.183 * |
| en_leviticus2 | * 0.412 * | 0.000 | 0.002 | 0.000 | * 0.911 * |
| en_leviticus3 | * 0.967 * | 0.000 | 0.010 | 0.003 | * 0.253 * |
| en_leviticus4 | * 0.824 * | 0.000 | −0.012 | 0.000 | * −0.566 * |
| es_genesis1 | 0.000 | * 0.828 * | −0.001 | * −0.561 * | 0.000 |
| es_genesis2 | 0.000 | * 0.815 * | 0.000 | * 0.579 * | 0.000 |
| es_genesis3 | 0.000 | * 0.844 * | −0.002 | * 0.536 * | 0.000 |
| es_genesis4 | 0.000 | * 0.274 * | 0.000 | * 0.962 * | 0.000 |
| fr_exodus1 | 0.000 | 0.013 | * 0.998 * | 0.033 | −0.053 |
| fr_exodus2 | 0.003 | 0.000 | * 0.999 * | 0.003 | −0.037 |
| fr_exodus3 | 0.003 | 0.002 | * 0.999 * | 0.000 | −0.035 |
| fr_exodus4 | 0.007 | 0.001 | * 1.000 * | −0.003 | 0.015 |

A decision tree model can be formulated (one model among many that fits the data) as follows, using machine learning, as shown in TABLE 5.

TABLE 5

- If dim0 > 0.1
  - The document contains English
- If dim1 > 0.1
  - The document contains Spanish
- If dim2 > 0.1
  - The document contains French A document to be identified by language can be received—Block 240. In the continuing example, the document of TABLE 6, from the beginning of the Spanish text of the novel Don Quijote is received.

TABLE 6

Document to be Identified by Language in the Continuing Example

En un lugar de la Mancha, de cuyo nombre no quiero acordarme, no ha mucho tiempo que vivía un hidalgo de los de lanza en astillero, adarga antigua, rocín flaco y galgo corredor.

A vector in the LSI index can be generated for the document to be identified by language—Block 250. In the continuing example, the first four dimensions of a vector corresponding to the document of TABLE 6 in the LSI index corresponding to TABLE 4 is shown in TABLE 7.

TABLE 7

|  | dim0 | dim1 | dim2 | dim3 | dim4 |
|---|---|---|---|---|---|
| quijote_passage | 0.000 | 0.444 | 0.022 | 0.896 | 0.000 |

The vector can be evaluated against the language classification model—Block 260. In the continuing example, dim0>0.1 is not true, but dim1>0.1 is true—so the document of TABLE 6 contains Spanish.

Figure 3:
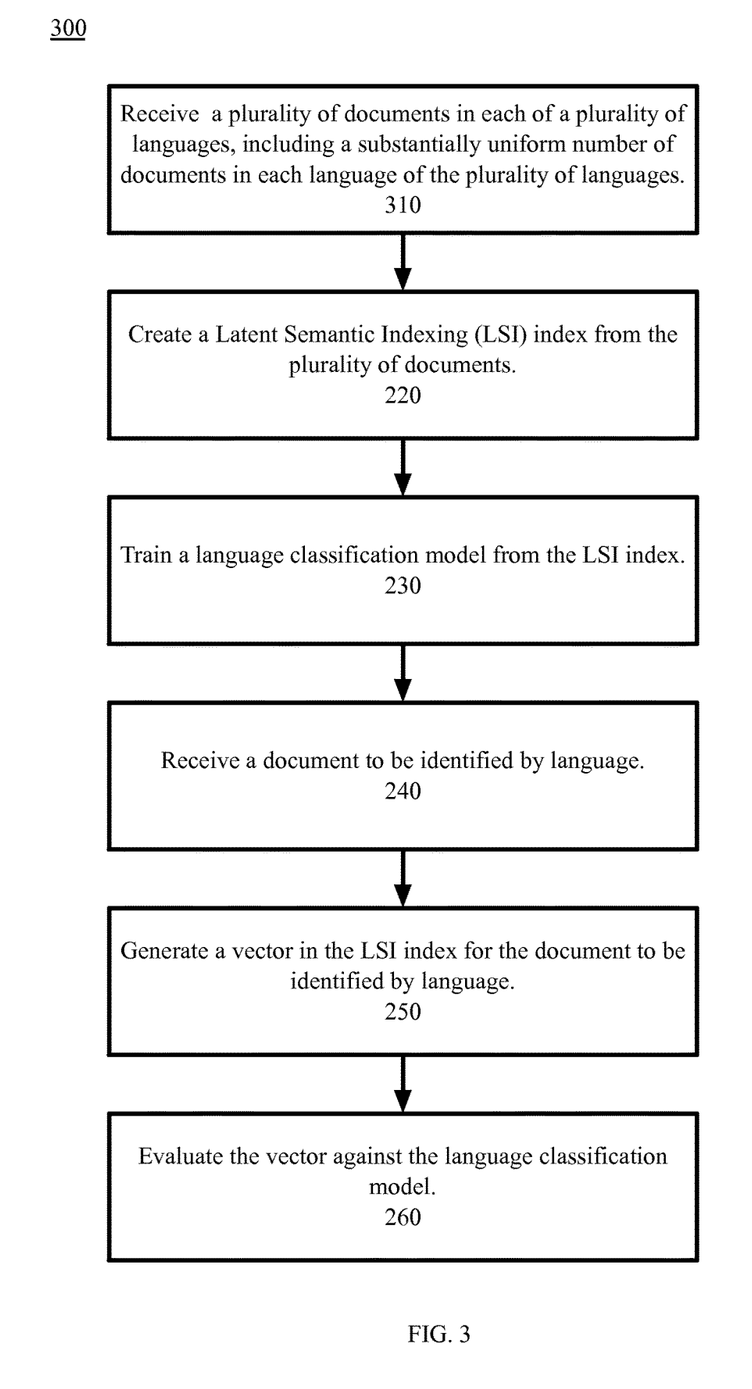
FIG. 3 is a block flow diagram depicting language identification, in accordance with certain example embodiments of the disclosed technology.

Referring to FIG. 3, and continuing to refer to prior figures for context, methods 300 for product selection in accordance with example embodiments of the disclosed technology are depicted. In such methods 300, Blocks 220, 230, 240, 250, and 260 are performed as described elsewhere herein. In such methods, a plurality of documents in each of a plurality of languages, including a substantially uniform number of documents in each language of the plurality of languages can be received as the corpus from which to create the LSI index—Block 310.

Figure 4:
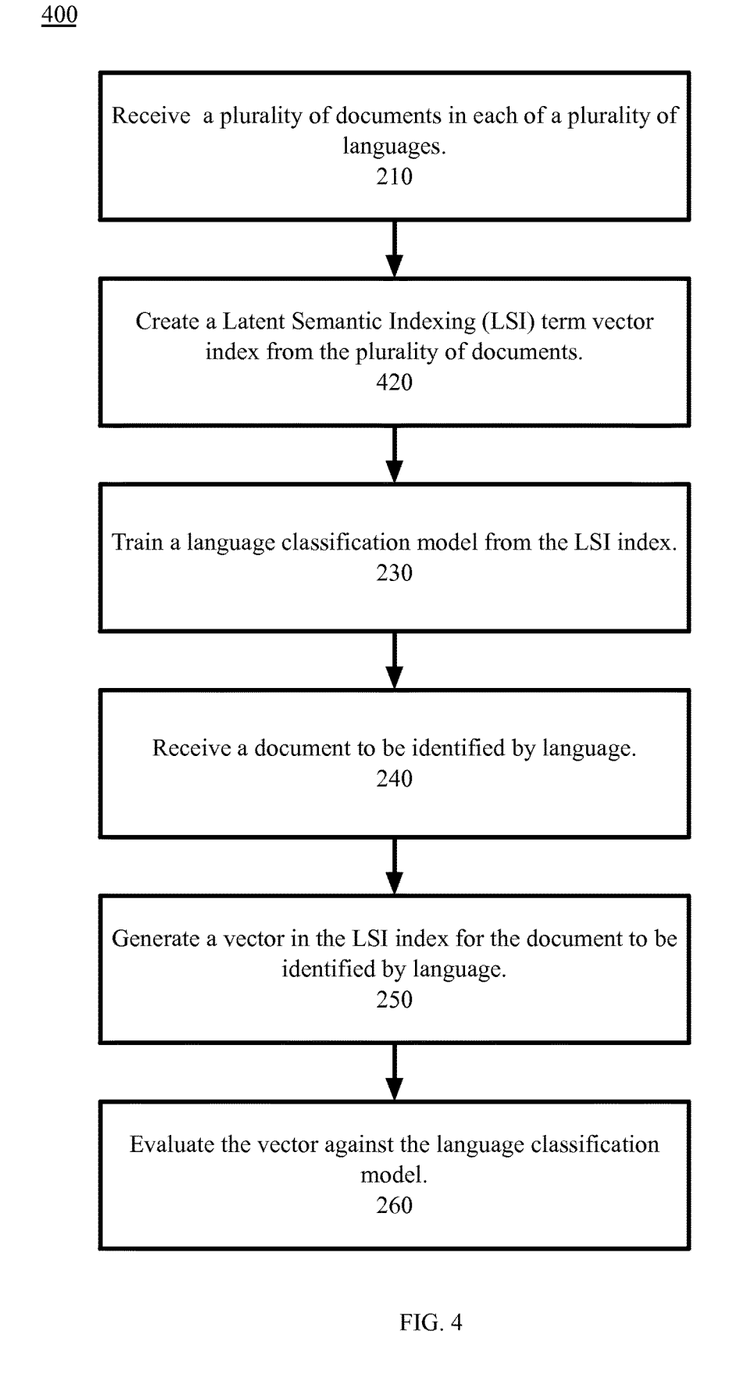
FIG. 4 is a block flow diagram depicting language identification, in accordance with certain example embodiments of the disclosed technology.

Referring to FIG. 4, and continuing to refer to prior figures for context, methods 400 for product selection in accordance with example embodiments of the disclosed technology are depicted. In such methods 400, Blocks 210, 230, 240, 250, and 260 are performed as described elsewhere herein. In such methods, a Latent Semantic Indexing (LSI) term vector index can be created from the plurality of documents—Block 420.

Figure 5:
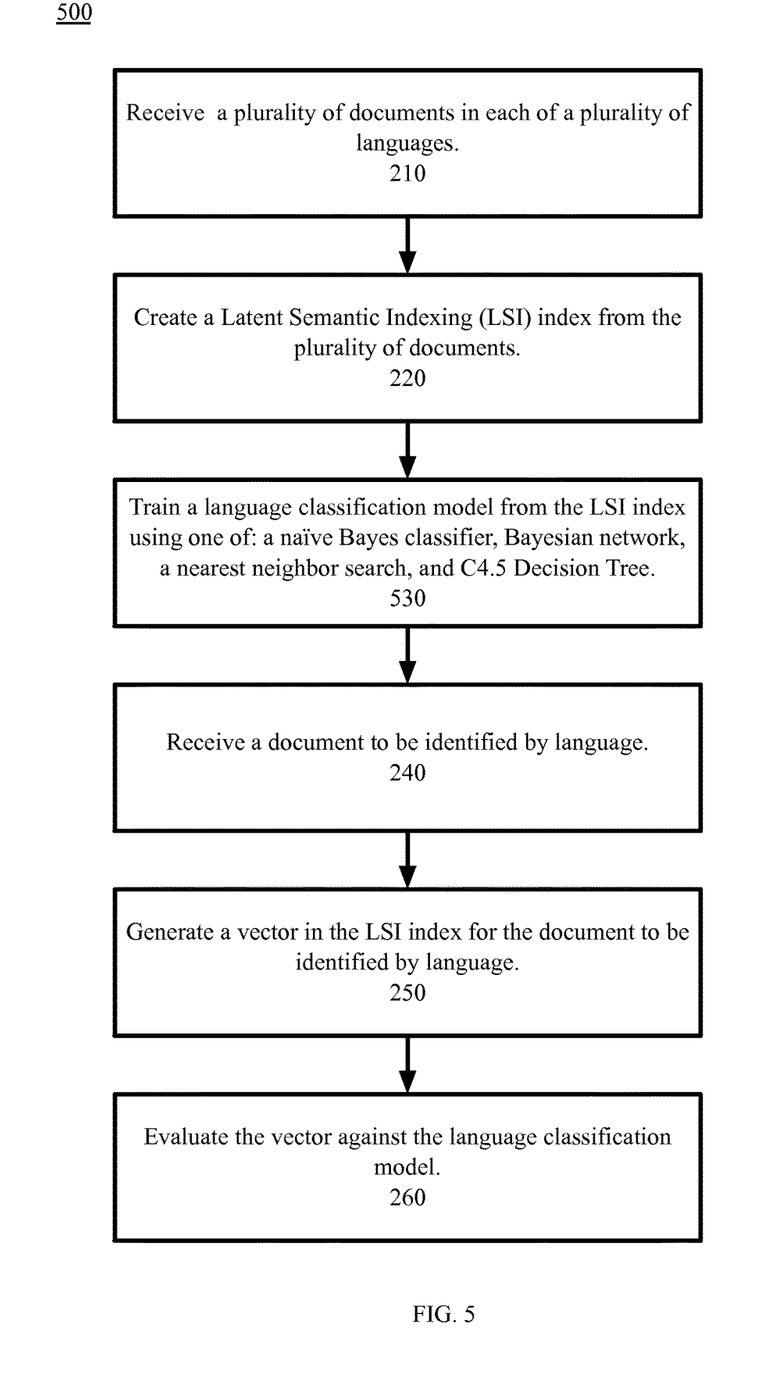
FIG. 5 is a block flow diagram depicting language identification, in accordance with certain example embodiments of the disclosed technology.

Referring to FIG. 5, and continuing to refer to prior figures for context, methods 500 for product selection in accordance with example embodiments of the disclosed technology are depicted. In such methods 500, Blocks 210, 220, 240, 250, and 260 are performed as described elsewhere herein. In such methods, a language classification model is trained from the LSI index using one of: a naïve Bayes classifier, a Bayesian network, a nearest neighbor search, and a C4.5 Decision Tree—Block 530.

Figure 6:
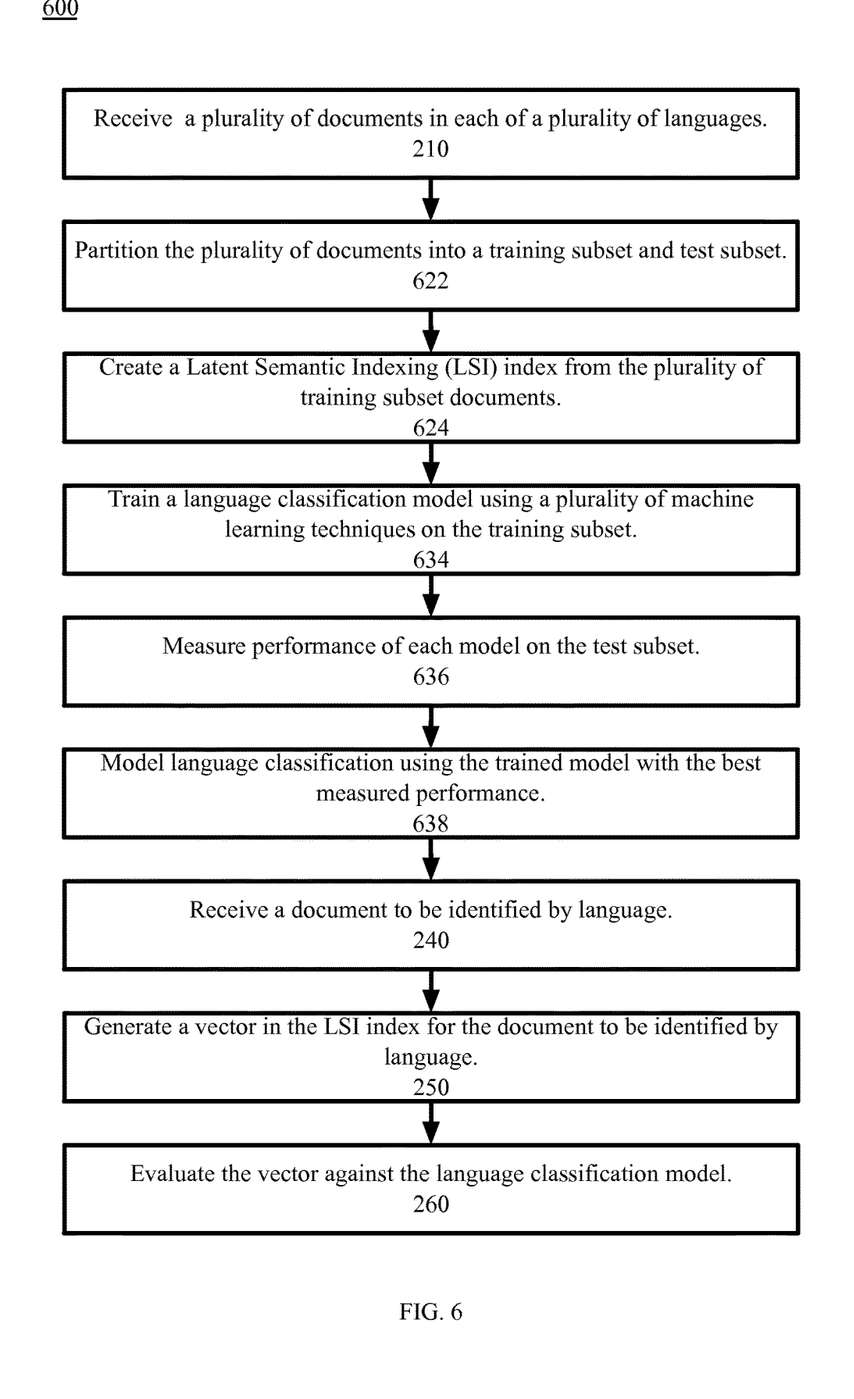
FIG. 6 is a block flow diagram depicting language identification, in accordance with certain example embodiments of the disclosed technology.

Referring to FIG. 6, and continuing to refer to prior figures, methods 600 for product selection in accordance with example embodiments of the disclosed technology are depicted. In such methods 600, Blocks 210, 240, 250, and 260 are performed as described elsewhere herein. In such methods, after receiving a plurality of documents in each of a plurality of languages, the plurality of documents can be partitioned into a training subset and a test subset—Block 622. An LSI index can be created from the plurality of training subset documents—Block 624. A language classification model can be trained using each of a plurality of machine learning techniques on the training subset—Block 634. Consider as a second example that each of a naïve Bayes, Bayesian network, a nearest neighbor search, and C4.5 decision tree model is trained on a training subset. The performance of each model can be measured using the known language of the documents in the test subset—Block 636.

Referring to FIG. 7, and continuing to refer to prior figures for context, methods 700 for product selection in accordance with example embodiments of the disclosed technology are depicted. In such methods 700, Blocks 210, 622, 624, 634, 638, 240, 250 and 260 are performed as described elsewhere herein. In such methods, the performance of each model trained on documents of the training subset can be measured against the documents of the testing subset using at least one of: a true positive rate, a false positive rate, a precision, a recall, and an F-measure.

Consider, as second example, documents across four (4) languages: Arabic (ar), German (de), English (en), and Farsi (fa). The documents are randomly selected from a large corpus. TABLE 8 specifies a document identifier for each document.

TABLE 8

| Language | Doc ID | Language | Doc ID | Language | Doc ID | Language | Doc ID |
|---|---|---|---|---|---|---|---|
| ar | 2295 | de | 411384 | en | 91651 | fa | 1559 |
| ar | 11168 | de | 430758 | en | 885357 | fa | 18688 |
| ar | 27725 | de | 463509 | en | 1614135 | fa | 54876 |
| ar | 30526 | de | 764000 | en | 2948519 | fa | 151699 |
| ar | 122802 | de | 969331 | en | 6157807 | fa | 160185 |
| ar | 143599 | de | 992802 | en | 8400117 | fa | 183841 |
| ar | 289190 | de | 1140055 | en | 9500351 | fa | 265252 |
| ar | 422322 | de | 2847280 | en | 9810279 | fa | 425645 |
| ar | 477821 | de | 3135711 | en | 1723382 | fa | 425778 |
| ar | 653651 | de | 3692580 | en | 2950855 | fa | 430440 |

In many LSI applications, data cleanup of the training corpus is common, particularly in a dataset as noisy as the corpus from which these documents were pulled (an open content source). For this example, no data cleanup is performed to demonstrate the effectiveness of the technique even on a basic example. In several documents of TABLE 8, English language content was mixed into the articles of other languages. For example, the content of document ID ar-122802 is: "ﺗﺮﻛﻴﺎ ﺟﻤﺎل ﻣﻠﻜﺔ ﻫﻲ ﻟﻌﺒﺖ" ﻟﺬي أﻟﺘﻘﺖ ﻓﻲ ﺗﻮﺟﻲ ﻛﺎزاز وﻟﺪت أﻏﺴﻄﺲ loafing and camouflage sirens in the aegean, ﺍﻟﻔﻠﻢ ﺍﻟﻴﻮﻧﺎﻧﻲ ﻳﺴﻤﺢ ﻟﻬﺎ ﺑﺎﻟﺰﻭﺍﺝ ﻩ ﺯﻭﺟﻬﺎ ﺩﻭﺭﺍً ﻓﻲ ﺍﻟﻤﺴﻴﺤﻴﺔ ﺍﻷﺭﺛﻮﺫﻭﻛﺴﻴﺔ ﻗﺒﻞ ﺯﻭﺍﺟﻬﺎ ﻟﻜﻲ ﻗﺎﻣﺖ ﺑﺎﻋﺘﻨﺎﻕ ﺳﻴﺪﻳﺲ ﺟﻮﺭﺝ ﺍﺗﺴﺎﻟﺪﺑﺔ ﻓﻲ ﺑﻠﺪﻫﺎ ﺑﺎﻟﻜﻨﻴﺴﺔ ﻭﻫﺬﺍ ﺍﻝ ﻋﻤﻞ ﺃﺩﻯ ﺇﻟﻰ ﺍﻧﻔﻌﺎﻝ".

Further, one of the Arabic documents, ar-143599, contains only English: "zoologist desmond surrealist works that includes what morris describes as biomorphs http images eu.amazon.com images p lzzzzzzz.jpg richard dawkins this image of the book cover of feel it is covered by the u.s fair use laws because it is a low resolution copy of a book cover it does not limit the copyright owners rights to sell the book in any way copies could not be used to make illegal copies of the book the image on the cover is significant to both articles because it is the authors most well known work and as the cover of the original edition illustrates important aspects of the articles." This document is clearly mislabeled as Arabic. However, this will often happen with large data collections.

An LSI training index was created from the documents of TABLE 8 after preprocessing which included term filtering and term normalization. No stopword filtering was performed. An example extract from the term-document matrix formed from the documents of TABLE 8 is shown in TABLE 9.

TABLE 9

| | ab | aber | aberdeen | abilities | abschnitt | ... |
|---|---|---|---|---|---|---|
| doc0 | 4 | 0 | 0 | 0 | 2 | ... |
| doc1 | 3 | 0 | 0 | 0 | 0 | ... |
| doc2 | 4 | 0 | 0 | 0 | 0 | ... |
| doc3 | 0 | 0 | 0 | 0 | 0 | ... |
| doc4 | 0 | 0 | 0 | 0 | 0 | ... |
| ... | 0 | 0 | 0 | 0 | 0 | ... |
| ... | 0 | 0 | 0 | 1 | 0 | ... |

As with the continuing example, dimensionality reduction is performed using a PYTHON® programming language SVD program (scipy.numpy.linalg). Application of SVD yields a 40×40 document matrix, a portion of which is shown in TABLE 10.

TABLE 10

| Document | dim0 | dim1 | dim2 | dim3 | dim4 |
|---|---|---|---|---|---|
| ar-2295.txt | 0.007 | −0.001 | 0.006 | −0.027 | −0.002 |
| ar-11168.txt | 0.059 | −0.001 | 0.091 | 0 | 0.016 |
| ar-27725.txt | 0 | −0.018 | 0.001 | −0.527 | 0 |
| ar-30562.txt | 0 | −0.017 | 0 | −0.141 | 0 |
| ar-122802.txt | 0 | −0.007 | 0 | −0.038 | −0.002 |

TABLE 10-continued

| Document | dim0 | dim1 | dim2 | dim3 | dim4 |
|---|---|---|---|---|---|
| ar-143599.txt | 0 | −0.017 | 0 | −0.168 | 0 |
| ar-289190.txt | 0 | −0.002 | 0 | −0.086 | 0 |
| ar-422322.txt | 0 | −0.022 | 0.002 | −0.794 | 0 |
| ar-477821.txt | 0 | −0.009 | 0 | −0.178 | 0 |
| ar-653651.txt | 0.013 | 0 | 0 | 0 | −0.132 |
| de-411384.txt | 0.017 | 0 | −0.002 | 0 | −0.294 |
| de-430758.txt | 0.032 | 0 | −0.007 | 0 | −0.357 |
| de-463509.txt | 0.014 | 0 | 0 | 0 | −0.213 |
| de-764000.txt | 0.002 | 0 | 0.004 | 0 | −0.119 |
| de-969331.txt | 0.008 | −0.004 | −0.001 | 0 | −0.073 |
| de-992802.txt | 0.016 | 0 | 0.002 | 0 | −0.201 |
| de-1140055.txt | 0.014 | −0.003 | 0 | 0 | −0.489 |
| de-2847280.txt | 0.042 | −0.001 | 0.035 | 0 | −0.614 |
| de-3135711.txt | 0.012 | 0 | −0.002 | 0 | −0.202 |
| de-3692580.txt | 0.834 | 0.007 | −0.547 | −0.001 | 0.043 |
| en-91651.txt | 0.031 | 0 | 0.041 | 0 | 0.002 |
| en-885357.txt | 0.402 | −0.005 | 0.665 | 0.002 | 0.048 |
| en-1614135.txt | 0.151 | −0.003 | 0.247 | 0.001 | 0.012 |
| en-2948519.txt | 0.031 | 0 | 0.042 | 0 | 0.005 |
| en-6157807.txt | 0.188 | −0.006 | 0.258 | 0.001 | 0.026 |
| en-8400117.txt | 0.192 | −0.001 | 0.209 | 0.001 | −0.033 |
| en-9500351.txt | 0.177 | −0.002 | 0.245 | 0.001 | 0.014 |
| en-9810279.txt | 0.073 | −0.001 | 0.105 | 0 | 0.015 |
| en-17233823.txt | 0.045 | −0.001 | 0.062 | 0 | 0.006 |
| en-29508559.txt | 0 | −0.401 | −0.005 | 0.011 | 0.004 |
| fa-1559.txt | 0 | −0.047 | −0.001 | 0.002 | 0.001 |
| fa-18688.txt | 0.001 | −0.116 | 0.002 | −0.003 | 0.002 |
| fa-54876.txt | 0 | −0.16 | −0.002 | 0.005 | 0.002 |
| fa-151699.txt | 0.001 | −0.773 | −0.008 | 0.029 | −0.003 |
| fa-160185.txt | 0 | −0.018 | 0 | 0 | 0 |
| fa-183841.txt | 0 | −0.435 | −0.006 | 0.014 | 0.008 |
| fa-265252.txt | 0 | −0.034 | 0 | 0.001 | 0 |
| fa-425645.txt | 0 | −0.074 | −0.001 | 0.003 | 0.001 |
| fa-425778.txt | 0 | −0.053 | −0.001 | 0.002 | 0 |

As in the continuing example, a variety of machine learning approaches can be used to develop the classification model (also known as a classifier). For example, structured prediction (such as Bayesian networks), supervised learning (such as naïve Bayes classifiers and decision trees), clustering, and neural networks can be used to train a language identification model from the LSI index.

After normalizing each vector to unit length (as shown in TABLE 10 for the first five (5) dimensions of each vector forming the normalized LSI index), several patterns can be detected, by application of machine learning, in relation to the language label of each document. Notice that in dim0, only English and German documents have significant non-zero values. In dim1, the English and German documents have values at or very near zero, while the Arabic and Farsi vectors significant negative values. It appears that, in the lowest dimensions, the English and German documents repel the Arabic and Farsi. However, in dim3, the Arabic and Farsi documents also repel each other. The Arabic vectors have negative values while the Farsi vectors have positive values. The English and German vectors demonstrate similar behavior across combinations of dimensions 2 and 4.

A decision tree model, such as one developed using machine learning, to automatically detect language for a given document vector can be written as shown in TABLE 11. In the second example, while the data has been chosen to produce a pattern apparent to an observer for illustration purposes, machine learning will detect patterns that would likely not be discernable to human observers.

TABLE 11

If dim0 > 0.002
  If ABS(dim2) < 0.01 AND dim4 > −0.02

TABLE 11-continued

The document contains English
If ABS(dim2) > 0.01 0 AND dim4 < 0.02
  The document contains German
If dim3 < −0.02
  The document contains Arabic
If dim1 < −0.02
  The document contains Farsi When applying the above decision tree model to the training document vectors, document ID ar-122802 matches multiple rules: Arabic and English. This is in fact the document that was marked as an Arabic language document but contained English language terms. This technique also identified document ID ar-143599 as an outlier. This document is marked as Arabic but only triggers the English language rule.

After training the model of the second example, the following text from the German proverb which as the English meaning: "better be alone than in bad company." Allein ist besser als mit Schlechten im Verein: mit Guten im Verein, ist besser als allein.

In the second example, the German proverb is mapped into the multi-lingual vector representation space. The same preprocessing steps applied during training should be applied to this text. Once the centroid of the term vectors is computed and the result is scaled by the singular values, the normalized document vector of TABLE 12 represents the test document of the second example.

TABLE 12

|  | dim0 | dim1 | dim2 | dim3 | dim4 |
|---|---|---|---|---|---|
| German_proverb | 0.01 | 0 | 0.012 | 0 | −0.395 |

Applying the classification model to the resulting normalized document vector triggers only the German rule, which correctly identifies this language of this block of text. Due to the small training corpus and the difference in the terminology between the training and the test document, there is very little overlap in terms. However, the language model contains enough information to correctly assign the language.

The technology disclosed herein offers improvements to machine translation and to special purpose machine translators, including machine translators that use audio input.

Other Example Embodiments

Figure 8:
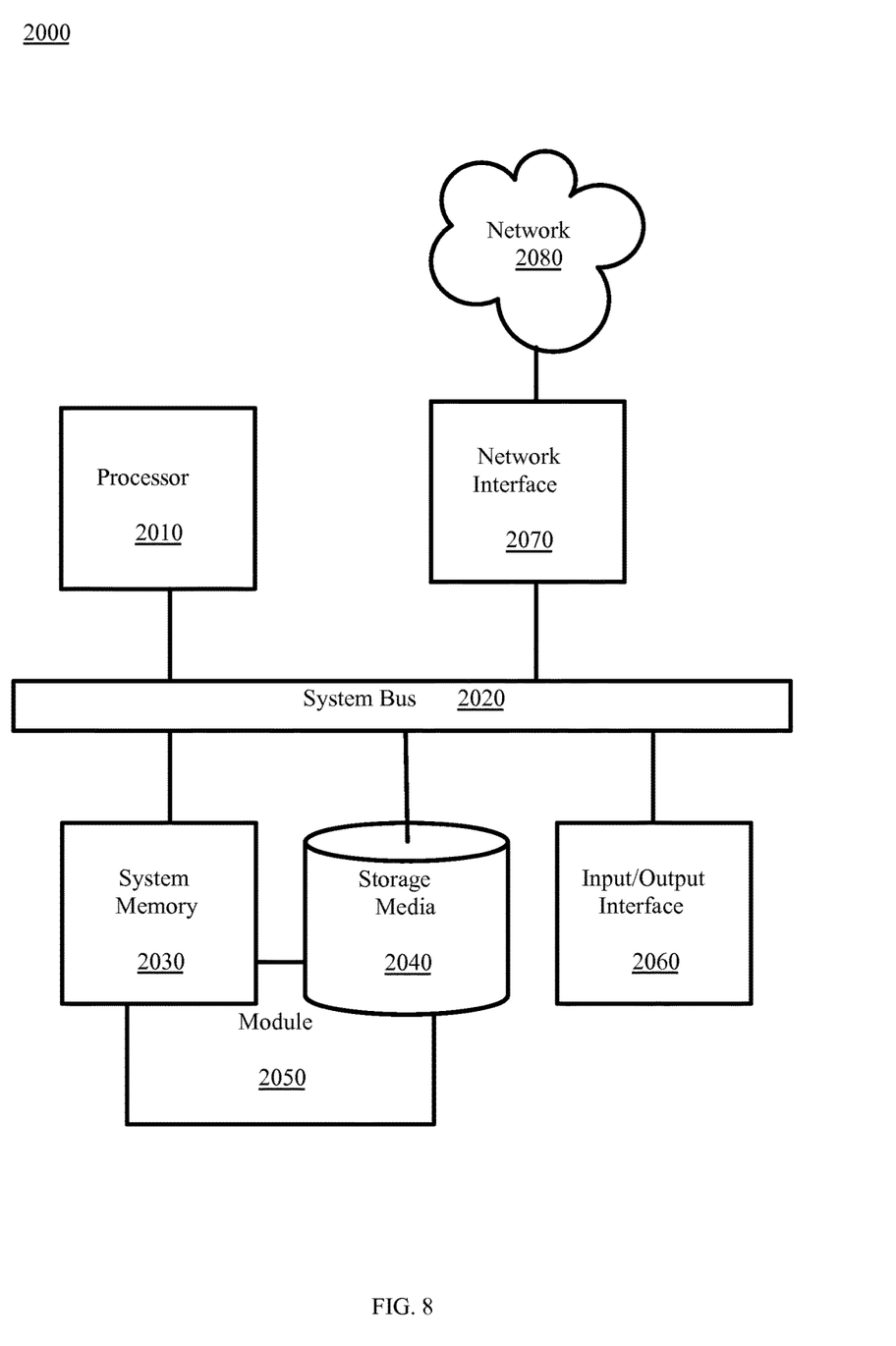
FIG. 8 is a diagram depicting a computing machine and a module, in accordance with certain example embodiments of the disclosed technology.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, determination of the stopping condition can occur at other points in the process illustrated in FIG. 2.

I claim:

1. A computer-implemented method for language identification, comprising:
    receiving, by at least one hardware processor, a plurality of documents in each of a plurality of languages;
    creating, by the at least one hardware processor, a Latent Semantic Indexing (LSI) index from the plurality of documents;
    training, by the at least one hardware processor, a language classification model based on the LSI index, where training the language classification model based on the LSI index comprises:
        determining a vector for each of the plurality of documents in each of the plurality of languages from the LSI index, where the vectors are generated from singular value decomposition of the plurality of documents in each of a plurality of languages;
        determining a combination of dimensions in the vector for each document that is indicative of the language of the document;
        determining rules from the combinations of dimensions determined from the vectors for the plurality of documents; and
        generating the language classification model from the rules;
    receiving, by the at least one hardware processor, a document to be identified by language;
    generating, by the at least one hardware processor, a vector in the LSI index for the document to be identified by language;
    evaluating, by the at least one hardware processor, the vector of the document to be identified by language against the language classification model; and
    identifying a language of the received document as being one of the plurality of languages based on the evaluating.

2. The method of claim 1, wherein the plurality of documents comprises a uniform number of documents in each language of the plurality of languages.

3. The method of claim 1, wherein the LSI index is a term vector index.

4. The method of claim 1, wherein training a language classification model from the LSI index comprises training the language classification model using one of: a naïve Bayes classifier, a Bayesian network, a nearest neighbor search, and a C4.5 Decision Tree.

5. The method of claim 1, wherein
creating a Latent Semantic Indexing (LSI) index from the plurality of documents comprises:
partitioning, by the at least one hardware processor, the plurality of documents into a training subset and test subset, and creating the LSI index; and
creating, by the at least one hardware processor, the LSI index from the plurality of training documents; and
training, by the at least one hardware processor, a language classification model from the LSI index comprises:
training, by the at least one hardware processor, a language classification model using each of a plurality of machine learning techniques on the training subset;
measuring, by the at least one hardware processor, the performance of each model on the test subset;
selecting one of the models according to the measured performances; and
modeling, by the at least one hardware processor, language identification using the selected model.

6. The method of claim 5, wherein the performance of each model is measured using at least one of: a true positive rate, a false positive rate, a precision, a recall, and an F-measure.

7. A computer program product, comprising:
a non-transitory computer-readable storage device having computer-executable program instructions embodied thereon that when executed by a computer cause the computer to identify a language of a communication, the computer-executable program instructions comprising:
computer-executable program instructions to receive a plurality of documents in each of a plurality of languages;
computer-executable program instructions to create a Latent Semantic Indexing (LSI) index from the plurality of documents;
computer-executable program instructions to train a language classification model based on the LSI index, wherein to train the language classification model based on the LSI index comprises:
determine a vector for each of the plurality of documents in each of the plurality of languages from the LSI index, where the vectors are generated from singular value decomposition of the plurality of documents in each of a plurality of languages;
for each document, determine a combination of dimensions in the vector for the document that is indicative of the language of the document;
determine rules from the combination of dimensions for each document for identifying a language of a document; and
generate the language classification model from the rules;
computer-executable program instructions to receive a document to be identified by language;
computer-executable program instructions to generate a vector in the LSI index for the document to be identified by language;
computer-executable program instructions to evaluate the vector of the document to be identified by language against the language classification model; and
computer-executable program instructions to identify a language of the received document as being in one of the plurality of languages based on an evaluation of the vector against the language classification model.

8. The computer program product of claim 7, wherein the plurality of documents comprises a uniform number of documents in each language of the plurality of languages.

9. The computer program product of claim 7, wherein the LSI index is a term vector index.

10. The computer program product of claim 7, wherein computer-executable program instructions to train a language classification model from the LSI index comprises computer-executable program instructions to train the language classification model using one of: a naïve Bayes classifier, a Bayesian network, a nearest neighbor search, and a C4.5 Decision Tree.

11. The computer program product of claim 7, wherein
computer-executable program instructions to create a Latent Semantic Indexing (LSI) index from the plurality of documents comprise:
computer-executable program instructions to partition the plurality of documents into a training subset and test subset, and creating the LSI index; and
computer-executable program instructions to create the LSI index from the plurality of training documents; and
computer-executable program instructions to train a language classification model from the LSI index comprise:
computer-executable program instructions to train a language classification model using each of a plurality of machine learning techniques on the training subset;
computer-executable program instructions to measure the performance of each model on the test subset;
computer-executable program instructions to select one of the models according to the measured performances; and
computer-executable program instructions to model language identification using the selected model.

12. The computer program product of claim 11, wherein the performance of each model is measured using at least one of: a true positive rate, a false positive rate, a precision, a recall, and an F-measure.

13. A system to identify the language of a communication, the system comprising:
a storage device; and
a processor communicatively coupled to the storage device, wherein the processor executes application code instructions received from the storage device to:
receive a plurality of documents in each of a plurality of languages;
create a Latent Semantic Indexing (LSI) index from the plurality of documents;
train a language classification model based on the LSI index, wherein to train the language classification model based on the LSI index comprises:

determine a vector for each of the plurality of documents in each of the plurality of languages from the LSI index, where the vectors are generated from singular value decomposition of the plurality of documents in each of a plurality of languages;

for each document, determine a combination of dimensions in the vector for the document that is indicative of the language of the document;

determine rules from the combination of dimensions for each document for identifying a language of a document; and generate the language classification model from the rules;

receive a document to be identified by language;

generate a vector in the LSI index for the document to be identified by language;

evaluate the vector of the document to be identified by language against the language classification model; and identify the language of the received document as being in one of the plurality of languages based on an evaluation of the vector against the language classification model.

14. The system of claim 13, wherein the plurality of documents comprises a uniform number of documents in each language of the plurality of languages.

15. The system of claim 13, wherein the LSI index is a term vector index.

16. The system of claim 13, wherein training a language classification model from the LSI index comprises training the language classification model using one of: a naïve Bayes classifier, a Bayesian network, a nearest neighbor search, and a C4.5 Decision Tree.

17. The system of claim 13, wherein creating a Latent Semantic Indexing (LSI) index from the plurality of documents comprises:

partitioning the plurality of documents into a training subset and test subset, and creating the LSI index; and training a language classification model from the LSI index comprises:

training a language classification model using each of a plurality of machine learning techniques on the training subset;

measuring the performance of each model on the test subset;

selecting one of the models according to the measured performances; and modeling language identification using the selected model.

18. The system of claim 17, wherein the performance of each model is measured using at least one of: a true positive rate, a false positive rate, a precision, a recall, and an F-measure.

* * * * *